(12) United States Patent
Hove

(10) Patent No.: US 6,275,567 B1
(45) Date of Patent: Aug. 14, 2001

(54) ROTARY-ANODE X-RAY TUBE PROVIDED WITH A HYDRODYNAMIC SLEEVE BEARING

(75) Inventor: Ulrich Hove, Norderstedt (DE)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/150,555

(22) Filed: Sep. 10, 1998

(30) Foreign Application Priority Data

Sep. 11, 1997 (DE) .............................................. 197 39 908

(51) Int. Cl.⁷ .............................. H01J 35/00; H01J 35/10; H01J 35/04
(52) U.S. Cl. ......................... 378/132; 378/133; 378/135; 378/121; 378/125; 378/131; 378/144
(58) Field of Search .................................... 378/132, 133, 378/135, 121, 125, 131, 144

(56) References Cited

U.S. PATENT DOCUMENTS 4,210,371 * 7/1980 Gerkeman et al. ....................... 308/9

FOREIGN PATENT DOCUMENTS 8705478.7   9/1988   (DE) ............................... H01J/35/10

* cited by examiner

Primary Examiner—Frank G. Font
Assistant Examiner—Armando Rodriguez
(74) Attorney, Agent, or Firm—John F. Vodopia

(57) ABSTRACT

The invention relates to a rotary-anode X-ray tube which includes a sleeve bearing which is composed of an inner and an outer bearing segment, the outer bearing segment including intermediate pieces and a holder on which the intermediate pieces bear so as to transfer the bearing forces. Suitable shaping of the external surfaces of the intermediate pieces and the inner surfaces of the holder which contact these outer surfaces ensures that the intermediate pieces become aligned with the bearing surfaces on the inner bearing segment. This strongly reduces the complexity of manufacture.

10 Claims, 2 Drawing Sheets

ROTARY-ANODE X-RAY TUBE PROVIDED WITH A HYDRODYNAMIC SLEEVE BEARING

BACKGROUND OF THE INVENTION

1. Field of the Invention

The invention relates to a rotary anode X-ray tube which includes a sleeve bearing which serves to journal the rotary-anode and includes an inner bearing segment and an outer bearing segment which is provided with a holder, intermediate pieces being provided between the holder and the inner bearing segment and correspondingly formed bearing surfaces on the inner bearing segment and in the intermediate pieces being arranged to take up radial and axial bearing forces. The invention also relates to a sleeve bearing which is suitable for use in a rotary-anode X-ray tube.

2. Description of Related Art

A rotary-anode X-ray tube and a sleeve bearing of this kind are known from DE-GM 87 05 478. Therein, the outer surfaces of the intermediate pieces are adapted to the tubular holder whereas their inner surfaces are adapted to the bearing surfaces on the inner bearing segment which have the form of a truncated cone. A bias force, applied to one of the intermediate pieces and produced by a spring, ensures that the bearing clearance remains constant also when the temperature of the sleeve bearing increases; however, the starting moment is thus also increased.

The bearing capacity of a sleeve bearing is dependent particularly on the distance between the bearing faces co-operating in the inner and the outer bearing segments. The bearing capacity of the sleeve bearing is greater as this distance is smaller. In practice this distance is of the order of magnitude of 10 $\mu$m. Such small distances, which should also remain constant across the bearing surfaces, can be achieved only by costly precision manufacture. In comparison with sleeve bearings which have bearing surfaces extending perpendicularly to the axis of rotation so as to take up the axial bearing forces and at least one cylindrical bearing surface for taking up the radial bearing forces, the known sleeve bearing offers the advantage that only two bearing surfaces (having the shape of a truncated cone) must be formed with the necessary precision on the inner bearing segment and in the intermediate pieces.

Moreover, however, the external surfaces of the intermediate pieces which are arranged in the tubular holder must also extend exactly concentrically with the conical bearing surfaces provided therein, because the bearing surfaces will otherwise be tilted. Finally, the outer diameter of the intermediate pieces must be very accurately adapted to the inner diameter of the tubular holder in order to ensure that on the one hand the intermediate pieces can slide in the tubular holder and that on the other hand no play remains between the facing surfaces of the intermediate pieces on the one side and the tubular holder on the other side.

SUMMARY OF THE INVENTION

It is an object of the present invention to provide a rotary-anode X-ray tube which includes a sleeve bearing that can be more readily manufactured. On the basis of a rotary-anode X-ray tube of the kind set forth, this object is achieved in that the facing surfaces of the intermediate pieces and the holder are formed in such a manner that the intermediate pieces within the holder are aligned with the bearing surfaces.

Because of the shaping of the facing surfaces of the holder and the intermediate pieces according to the invention it is achieved that the bearing surfaces in the intermediate pieces are aligned with the bearing surfaces on the inner bearing segment even when the external surfaces of the intermediate pieces which come into contact with the holder do not extend exactly concentrically with respect to the bearing surfaces provided therein. Thus, in a sleeve bearing of this kind it is only important that the bearing surfaces in the intermediate pieces on the one side and on the inner bearing segment on the other side correspond exactly.

The inner surfaces of the holder and the outer surfaces of the intermediate pieces which come into contact therewith must be formed so that the intermediate pieces can be tilted relative to the holder. The maximum tilt angle required is dependent on the precision of manufacture; however, it can be easily kept small, for example less than 1°. To this end, both of said surfaces may be shaped as a segment of sphere as in a spherical bearing. However, the manufacture is easier when said surfaces are formed in conformity with the claims 2 and 3.

The bearing surfaces must be shaped so that they are capable of taking up radial forces on the one hand and axial bearing forces on the other hand, the axial bearing forces to be taken up by the two bearings being oppositely directed. The normals to the rotationally symmetrical bearing surfaces, therefore, may extend neither parallel with nor at right angles to the axis of rotation, at least not in a given region. A shape of the bearing surfaces that can be comparatively easily realized is disclosed in claim 4.

Claim 5 describes an embodiment which facilitates the assembly of the sleeve bearing. In conformity with one embodiment, the adjustment of the two parts, and hence the adjustment of the bearing play, can be performed by screwing one part more or less far into the other part. The bearing play governing the operation of the sleeve bearing, therefore, is not imposed by high-precision manufacture, as in rotary-anode X-ray tubes with separate bearing surfaces for the axial and radial bearing forces, but by means of a simple adjusting operation.

Generally speaking, the friction between the intermediate pieces and the holder suffices to prevent rotation of the intermediate pieces relative to the holder during rotation of the sleeve bearing. However, if necessary, the possibility of such rotation can be completely precluded by means of the embodiment disclosed in claim 7.

The claims 8 and 9 disclose possibilities for connecting the bearing segments to the envelope of the X-ray tube. The alternative disclosed in claim 8 offers the advantage that heat can be discharged from the bearing via an inner bore which extends inside the inner bearing segment in the direction of the axis of rotation.

BRIEF DESCRIPTION OF THE DRAWING

The invention will be described in detail hereinafter with reference to the drawings. Therein.

DESCRIPTION OF THE PREFERRED EMBODIMENT

Figure 1:
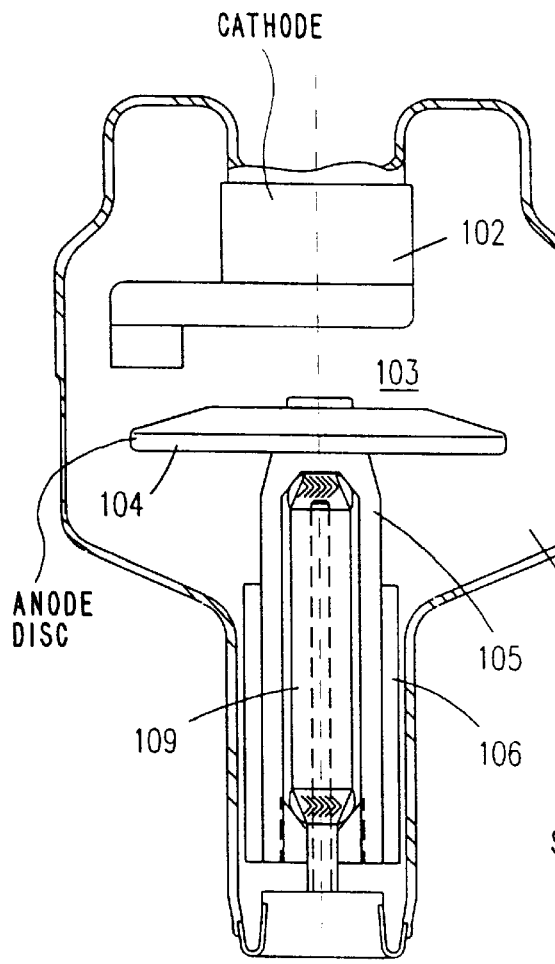
FIG. 1 shows an X-ray tube according to the invention.

FIG. 1 shows diagrammatically a rotary-anode X-ray tube whose vacuum envelope, for example made of glass, is denoted by the reference numeral 101. A cathode 102 and a rotary-anode 103 are connected to the vacuum envelope 101. The rotary-anode includes an anode disc 104 which is connected to a holder 105. A rotor 106 is connected to the holder, said rotor co-operating with a stator (not shown) outside the tube envelope 101 in order to drive the anode disc 104.

Figure 2:
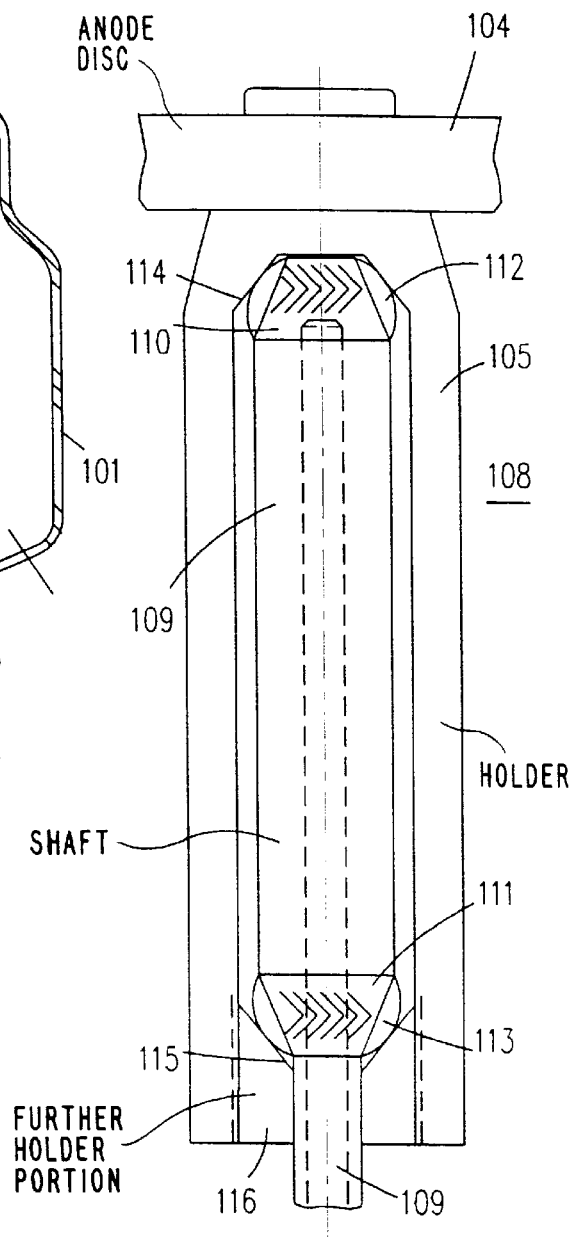
FIG. 2 shows the sleeve bearing of this X-ray tube.

The anode disc 104 is journaled in a sleeve bearing which consists of an outer (in this case rotatable) bearing segment and an inner (stationary) bearing segment which is enclosed thereby. FIG. 2 shows the sleeve bearing at a larger scale than FIG. 1. The Figure shows a shaft 109 which is associated with the inner bearing segment and is rigidly connected to the tube envelope, the upper end of said shaft being provided with a bearing surface 110 which is tapered upwards as a truncated cone and is provided with a spiral groove pattern. At the lower area of the shaft 109 there is provided a similar bearing surface 111 which, however, is tapered downwards; the shaft 109 extends further downwards with a correspondingly reduced diameter.

In conjunction with the inner surfaces of two intermediate pieces 112 and 113, also shaped as truncated cones, the bearing surfaces 110 and 111 constitute a respective spiral groove bearing which is capable of taking up axial and radial bearing forces at the same time. The outer surfaces of the intermediate pieces 112, 113 are preferably shaped as a segment of sphere. The outer surface of the intermediate piece 112 bears on an inner surface 114 of a holder portion 105; this inner surface 114 is symmetrical with respect to the axis of rotation and is shaped as a truncated cone. Similarly, the outer surface of the lower intermediate piece 113 bears on the inner surface 115, again shaped as a truncated cone, of a further holder portion 116 which is also symmetrical with respect to the axis of rotation and is connected to the holder portion 105, via a thread, so as to be adjustable in the axial direction. The two holder portions 105 and 116 together constitute a holder 108 which supports the intermediate pieces 112 and 113 in the radial direction and in the axial direction. A liquid lubricant having a low vapor pressure, for example a gallium alloy, is present in the gap between the bearing surface 110 and the intermediate piece 112 as well as in the gap between the bearing surface 111 and the intermediate piece 113 (these gaps are not visible in the drawing).

Upon assembly of the sleeve bearing, the intermediate piece 112 is arranged in the holder while the holder portion 116 is still screwed out, after which the shaft 109 is inserted into the holder and the intermediate piece 113 is slid onto the lower bearing surface. Subsequently, the holder portion 116 is screwed into the holder portion 105, the external surfaces of the intermediate pieces 112 and 113 then being aligned in such a manner that the bearing surfaces provided in the interior thereof are pressed against the bearing surfaces 110 and 111 over their entire surface. Subsequently, the holder portion 116 is loosened in a defined manner so as to adjust the desired bearing play.

The shaft 9 there may be provided with an interior cooling bore which extends in the axial direction and via which the heat which reaches the shaft 109 via the holder, the intermediate pieces and the lubricant can be dissipated. During rotation of the anode disc 104, the intermediate pieces 112, 113 rotate in synchronism therewith. Their areas of contact with the holder portions 105 and 116, respectively, is small but generally they suffice to take along the intermediate pieces 112 and 113.

Figure 5:
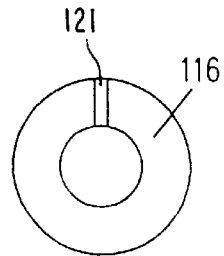
FIG. 5 shows a further embodiment of the sleeve bearing.

Rotation between the intermediate pieces 112, 113 and the holder portions 105, 116 can be avoided by providing the holder portion (as is shown in a plan view in FIG. 5 for the holder portion 116) with a radially projecting rib 121 (or a pin) which can engage a groove (not shown) in the intermediate piece. This groove should be deeper than the rib 121, so that only the convex outer surface of the intermediate piece can bear on the conical inner surface 114 or 115. Moreover, the grooves should be wider than the ribs so that the intermediate pieces can be tilted relative to the inner surfaces.

Figures 3, 4:
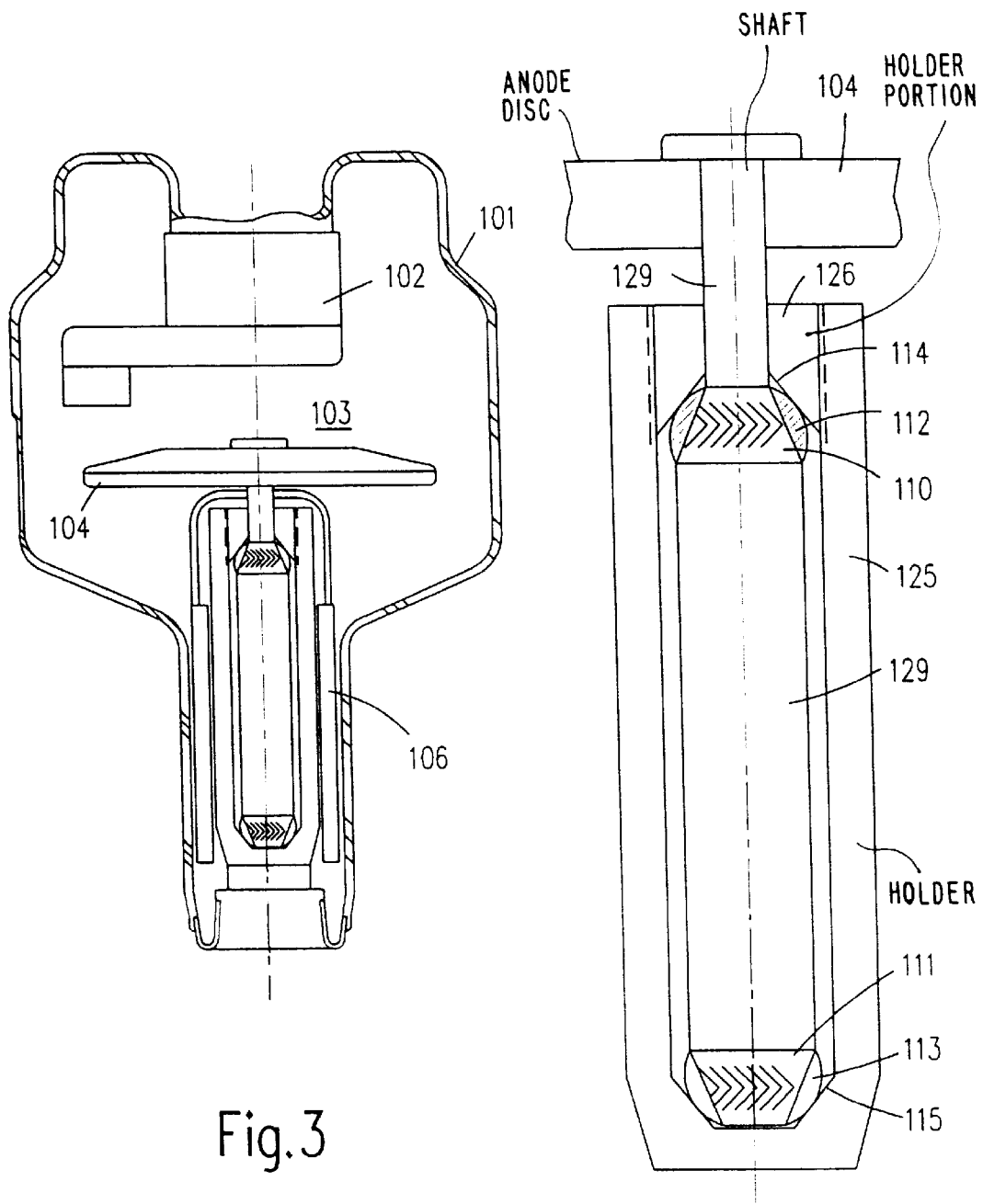
FIG. 3 shows a further embodiment of an X-ray tube.
FIG. 4 shows the associated sleeve bearing.

In the FIGS. 1 and 2 an embodiment is concerned in which the inner segment of the sleeve bearing is rigidly connected to the tube envelope and the outer segment is connected to the anode disc 104. The FIGS. 3 and 4 show an embodiment in which the outer bearing segment of the sleeve bearing is connected to the tube envelope and the inner bearing segment is connected to the anode disc 104. The rotor 106 is connected to a shaft 129.

As is shown in FIG. 4, the anode disc is supported by the shaft 129 which widens downwards as a truncated cone at the area of a bearing surface 110 and changes over into a portion of a larger diameter; at the end of this portion there is provided the bearing surface 111 which is tapered downwards as a truncated cone. In conjunction with the correspondingly shaped bearing surfaces in the intermediate pieces 112, 113, the bearing surfaces 110, 111 again form sleeve bearings for taking up radial and axial bearing forces. The holder, being stationary while the anode disc rotates, includes a portion 125 which is open towards the anode, is connected to the tube envelope and has inner surfaces comprise an area 115 at their lower end which is shaped as a truncated cone; it also includes a holder portion 126 which is adjustable in the axial direction therein by way of an external thread and whose surfaces 114, extending downwards as a truncated cone, fix the upper intermediate piece 112. Dissipation of heat via a bore extending in the axial direction is not simply possible in this case.

The ring-shaped intermediate pieces at the upper end of the sleeve bearing shown in FIG. 2 and at the lower end of the sleeve bearing shown in FIG. 4 may also be shaped as a cap, so that they seal the upper and the lower bearing from the environment and no lubricant can escape at these areas.

The inner surfaces of the holder in the embodiment have a conical shape and the contacting external surfaces of the intermediate pieces have a convex, rotationally symmetrical shape. These surfaces may also have a different shape, for example the shape of a segment of sphere, or the inner surfaces may be concave and the external surfaces may have a convex shape. It is essential for all of said possibilities that the intermediate pieces can be tilted relative to the holder.

What is claimed is:

1. A rotary-anode X-ray tube including a holder, the X-ray tube further including a sleeve bearing including equivalent first and second bearing surfaces at first and second ends of the sleeve bearing, which sleeve bearing serves to journal a rotary-anode comprising an anode disc, said X-ray tube further including a shaft associated with an inner bearing segment and an outer bearing segment, wherein first and second intermediate pieces are provided between the holder and the inner bearing segment and said bearing surfaces are correspondingly formed on the inner bearing segment, the intermediate pieces being arranged to take up radial and axial bearing forces, and wherein facing surfaces of the first and second intermediate pieces and the holder are formed in such a manner that the first and second intermediate pieces in the holder are respectively aligned with the first and second bearing surfaces.

2. A rotary-anode X-ray tube as claimed in claim 1, characterized in that the surfaces of the intermediate pieces which face the holder have a convex, rotationally symmetrical shape.

3. A rotary-anode X-ray tube as claimed in claim 2, characterized in that the surfaces of the holder which face the intermediate pieces are shaped like a surface of a cone.

4. A rotary-anode X-ray tube as claimed in claim 1, characterized in that the bearing surfaces on the inner bearing segment and in the intermediate pieces are shaped like a surface of a cone.

5. A rotary-anode X-ray tube as claimed in claim 1, characterized in that the holder includes two portions which are adjustable relative to one another in the axial direction.

6. A rotary-anode X-ray tube as claimed in claim 5, characterized in that the two portions of the holder are connected to one another via a thread.

7. A rotary-anode X-ray tube as claimed in claim 1, characterized in that the holder and the intermediate pieces are locked against rotation by means of locking elements which co-operate by locking.

8. A rotary-anode X-ray tube as claimed in claim 1, characterized in that the inner bearing segment is connected to an envelope of the rotary-anode X-ray tube.

9. A rotary-anode X-ray tube as claimed in claim 1, characterized in that the outer bearing segment is connected to an envelope of the rotary-anode X-ray tube.

10. A sleeve bearing which includes a holder the sleeve bearing including an inner bearing segment and an outer bearing segment wherein intermediate pieces are provided between the holder and the inner bearing segment and correspondingly formed bearing surfaces on the inner bearing segment, the intermediate pieces being arranged to take up radial and axial bearing forces, and wherein facing surfaces of the intermediate pieces and the holder are formed in such a manner that the intermediate pieces in the holder are aligned with the bearing surfaces.

* * * * *